Jan. 26, 1965    W. SMIT ETAL    3,167,754
SELF-CHECKING SUPERVISION CIRCUIT
Filed Sept. 14, 1961
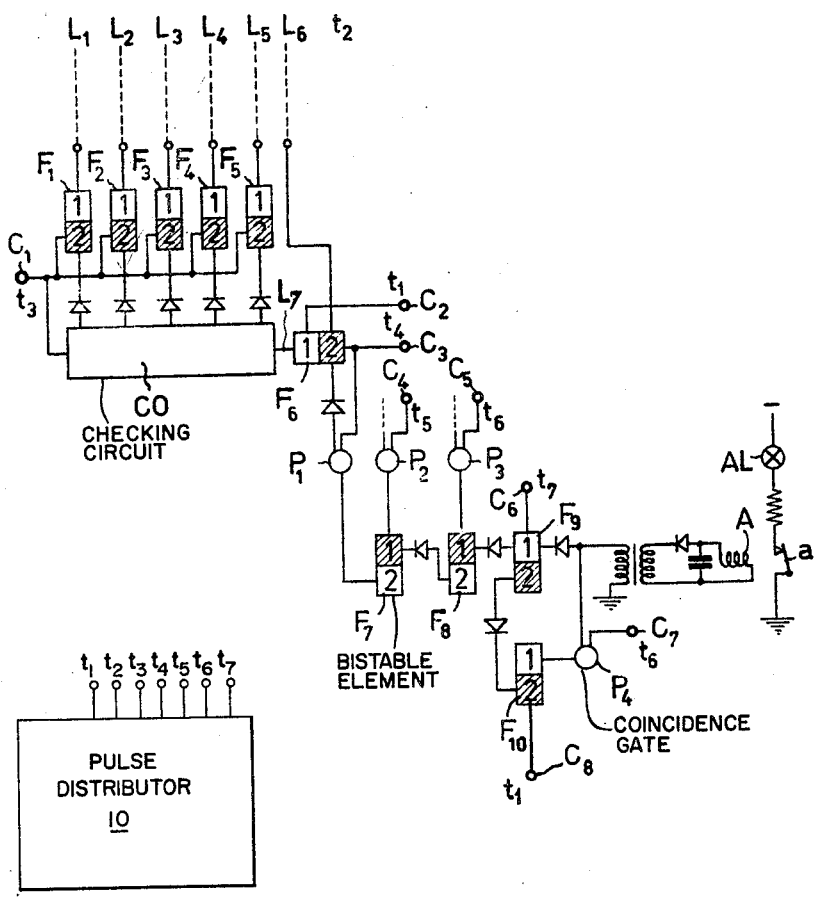
INVENTOR
WILLEM SMIT
ANTONIE W. VAN 'T SLOT
BY
AGENT

United States Patent Office

3,167,754
Patented Jan. 26, 1965

3,167,754
SELF-CHECKING SUPERVISION CIRCUIT
Willem Smit and Antonie Wijbe van 't Slot, both of Hilversum, Netherlands, assignors to North American Philips Company, Inc., New York, N.Y., a corporation of Delaware
Filed Sept. 14, 1961, Ser. No. 138,201
Claims priority, application Netherlands, Sept. 17, 1960, 255,978
4 Claims. (Cl. 340—253)

The invention relates to a self-checking supervision circuit for one or several members which may be rendered operative each at a predetermined instant of a pulse cycle and deliver a checking pulse each time they have been rendered operative.

For the supervision of devices which are continuously operative and signify their operative condition by producing a rectified electric signal, it is known to use a pilot signal which is passed through gate circuits each of which is associated with a device and is conductive under the control of the electric checking signals. If such a signal is missing, the circuit for the pilot signal is broken and an alarm signal is given by a circuit which responds to the absence of the pilot signal.

Such supervisory circuits are self-checking, that is to say, certain faults which may occur in the supervisory circuit itself will produce the same alarm condition as is produced by faults which may occur in the devices to be supervised.

In the design of switching circuits, frequently the problem arises of supervising devices which are intermittently operative and deliver a checking pulse each time they are rendered operative. Two possibilities are to be distinguished. The first possibility consists in that the devices are periodically operative. In this event the checking pulses may in principle be integrated, the integrated signal controlling a gate circuit. The second possibility consists in that the devices are aperiodically operative. Frequently this second possibility is restricted to the case where the devices are operative at a fixed instant of a pulse cycle, the aperiodicity showing itself by the fact that the devices are not operative during each pulse cycle.

In this latter case, it has been proposed to render a gate circuit associated with one of the devices non-conductive each time the respective device is rendered operative, and to render the gate circuit conductive again under the control of the checking pulse. In this case, a pilot signal consisting of a periodic pulse train may be used. The number of devices which can be supervised by means of one pilot signal is limited by the fact that the time intervals within which gate circuits can be non-conductive should not fill a full period of the pulse cycle.

If a pulse of the pilot signal is missing, an alarm signal is given by a circuit which responds to the periodicity of the pilot signal.

This solution has a disadvantage in that a fault in the control of the gate circuit due to which this circuit does not pass to the non-conductive condition when the associated device is rendered operative, is not indicated.

The object of the invention is to provide a supervision circuit which is self-checking in a higher degree.

According to the invention, a supervision circuit comprises a bistable element for each of the members to be supervised, which element is set to one condition at a fixed instant of each pulse cycle, may then be set to the other condition when the member to be supervised is rendered operative, may subsequently be set to the first mentioned condition again under the control of the checking pulse and finally is set to the other condition again at a fixed instant of the pulse cycle, whilst the element delivers a pulse at each passage from one condition to the other, the pulse delivered at the last-mentioned instant being selected and an alarm signal being given when this pulse is missing.

This arrangement provides the advantage that a fault in the control of the bistable element or a fault in the bistable element itself with a high degree of probability causes the same alarm signal to be given as when a checking pulse is missing.

In order that the invention may be readily carried into effect, an embodiment thereof will now be described, by way of example, with reference to the accompanying diagrammatic drawing.

In the single figure of the drawing, bistable elements are designated by $F_1$–$F_{10}$, coincidence gates by $P_1$–$P_4$, and a checking circuit by CO, the winding of a relay by A and an alarm lamp by AL.

A bistable element always is in one of its two possible conditions, which are designated by the squares in which the digit 1 or 2 is written. The rest condition of an element is indicated by shading of the square concerned. For example, in the figure, since block 2 of bistable element $F_1$ is shaded, this element is in condition 2. A pulse appearing on a conductor ending in a square sets the bistable element to the condition corresponding to the square. A conductor originating at a square carries a positive pulse when the element passes to the other condition, and a negative pulse when the element passes to the corresponding condition. Thus, a pulse appearing on the line leading to block 1 of $F_1$ in the drawing will set this element in condition 1, and in this case a positive pulse output will be applied to the diode connected to block 2 of element $F_1$. Diodes connected in the output conductors pass only the negative-going pulses.

A coincidence gate delivers a pulse at the output conductor only if a pulse is applied to each of the two input conductors at the same time.

The winding A is connected to a rectifying circuit to which periodic pulses are normally applied. The direct voltage produced across the winding is sufficient to keep the relay energised. In this condition, a break contact $a$ is open and the supply circuit for the lamp AL is broken.

The member to be supervised may be a known circuit for checking a known two out-of-five-code. A suitable arrangement for use as a checking circuit has been described in the United States Patent 2,719,962. This circuit is indicated by the rectangle CO, which is provided with five input terminals which, through diodes, are connected to the bistable elements $F_1$–$F_5$. The elements form a buffer register. The circuit is also provided with a control input connected to a terminal $C_1$ and with an output conductor $L_7$ connected to a bistable element $F_6$.

A pulse distributor 10 during each of its cycles delivers a number of successive pulses, for example, a train of seven pulses $t_1$–$t_7$, successive indices denoting successive instants within the pulse cycle.

The said arrangement operates as follows. At the instant $t_2$ of the pulse cycle, a pulse code group is applied through conductors $L_1$–$L_5$ to the bistable elements $F_1$–$F_5$ under the control of the pulse distributor. The bistable elements corresponding to a code element pass to the condition 1.

At the instant $t_1$ preceding the instant $t_2$, the bistable element $F_6$ is set to the condition 1 by a pulse appearing at a terminal $C_2$. Then, simultaneously with the transmission of the pulse code group, the bistable element $F_6$ is reset to the condition 2 by a pulse through a conductor $L_6$.

At the instant $t_3$, the pulse code group stored in the bistable elements $F_1$–$F_5$ is transferred to the checking member CO under the control of a pulse appearing at the terminal $C_1$. Under the control of this pulse, the code of the pulse code is simultaneously checked in the checking member CO in known manner. If the code is found correct, the checking member CO applies a pulse to the bistable element $F_6$ through the conductor $L_7$. This pulse sets the bistable element to the condition 1. At the instant $t_4$, the bistable element $F_6$ is restored to the rest position 2 under the control of a pulse at the terminal $C_3$. The output pulse of the bistable element $F_6$ is passed by the diode to a coincidence gate $P_1$. This pulse and the pulse at the terminal $C_3$ together render the gate $P_1$ conductive. Under the control of the output pulse of the gate $P_1$, a bistable element $F_7$ passes to the condition 2.

If, during a pulse cycle, no code group is supplied to the bistable elements $F_1$–$F_5$, the bistable element $F_6$ remains in the operative condition 1 at the instant $t_2$ and the next instant $t_3$. At the subsequent instant $t_4$, the bistable element $F_6$ returns to the rest position 2 under control of a pulse appearing at the terminal $C_3$. The output pulse of the bistable element $F_6$ and the pulse at the terminal $C_3$ together render the gate $P_1$ conductive and set the bistable element $F_7$ to the operative condition 2.

If, through the conductors $L_1$–$L_5$, a pulse code group is offered, the code of which does not satisfy the predetermined criterion, the checking member CO does not deliver a checking pulse. Thus, the bistable element $F_6$ remains in the rest condition 2, so that at the instant $t_4$ the element does not change its condition and does not deliver an output pulse.

The drawing further shows gate circuits $P_2$ and $P_3$. Input conductors shown by broken lines are connected to outputs of not-shown bistable elements in a manner similar to that in which the gate $P_1$ is connected to the bistable element $F_6$. These bistable elements may be associated with other checking members and deliver an output pulse at instants $t_5$ and $t_6$, respectively. These pulses are selected with the pulses at the terminals $C_4$ and $C_5$. The output pulse of the gate $P_2$ appearing at the instant $t_5$ sets the bistable element $F_7$ to the rest position 1. A bistable element $F_8$ is set to the operative condition 2 by the output pulse of the bistable element $F_7$ and is subsequently restored to the rest condition 1 by the output pulse of the gate $P_3$ at the instant $t_6$.

Hence, at the instant $t_6$ of each pulse cycle, the bistable element $F_8$ supplies a pulse to a special pulse circuit comprising bistable elements $F_9$ and $F_{10}$ and a coincidence gate $P_4$. This special pulse circuit has two stable conditions. In one condition, the bistable element $F_9$ continually changes its condition, and in the other condition the bistable element $F_9$ remains in the operative condition 1. This latter condition is produced if no pulse is applied to the circuit at an instant $t_6$. This pulse circuit further operates as follows. An output pulse of the bistable element $F_8$ appearing at the instant $t_6$ sets the bistable element $F_9$ to the operative condition 1. The output pulse of this element together with the pulse produced at a terminal $C_7$ sets the bistable element $F_{10}$ to the operative condition 1 through the gate $P_4$. At the next instant $t_1$, this element returns to the rest condition 2 under the control of a pulse at a terminal $C_3$. Under the control of the output pulse of the element $F_{10}$, the bistable element $F_9$ returns to the rest condition 2. If any of the output pulses of the gate $P_1$–$P_3$ are lacking, the bistable element $F_8$ does not change its condition in this pulse cycle. Hence, the bistable element $F_9$ is maintained in the rest condition 2 at the instant $t_6$. Now the bistable element $F_9$ is set to the operative condition 1 under the control of a pulse at the terminal $C_6$ at the instant $t_7$. The gate $P_4$ through the input conductors now receives a pulse from the terminal $C_7$ at the instant $t_6$ and subsequently, at the instant $t_7$, the output pulse of the bistable element $F_9$. As a result, the gate remains closed. This results in that the bistable element $F_{10}$ remains in the rest condition and the bistable element $F_9$ remains in the operative condition 1.

The output pulses of the bistable element $F_9$ are also applied to a rectifier circuit to which the relay winding A is connected. As a result, the relay is energised and a break contact $a$ opens the supply circuit of the lamp AL. When the pulse circuit has passed to the other condition, the direct voltage across the relay winding decreases and the relay releases. Thus, the supply circuit of the lamp AL is closed and the lamp is lit.

It should be noted that the bistable elements $F_1$–$F_{10}$ may be designed in known manner. The bistable element $F_6$ preferably comprises a transistor and a core of a magnetic material having a rectangular hyesteresis loop, which together constitute a self-blocking oscillator.

What is claimed is:

1. A self-checking supervision circuit comprising a source of coded signals to be checked, a checking circuit for checking said coded signals and providing a first pulse output when the coded signals being checked are correct, bistable element means having first and second stable conditions, first and second input terminal means, and output terminal means, said first input terminal means being arranged to set said bistable element means to said first condition upon application of a pulse thereto, said second input terminal means being arranged to set said bistable element means to said second condition upon the application of a pulse thereto, said output terminal being arranged to provide an output when said bistable elements are shifted from said first condition to said second condition, means for energizing said checking circuit and bistable element in cycles of a plurality of sequential instants comprising means for applying a pulse to said first input terminal means at a first instant, means for applying a pulse to said second input terminal means at a second instant only if a coded signal to be checked is present, means for applying said coded signal to said checking circuit at a third instant whereby said first pulse is applied to said first input terminal means at said third instant if said coded signals are present, means for applying a pulse to said second input terminal means at a fourth instant, means inhibiting output pulses from said output circuit except during said fourth instant, alarm means, and means connecting said alarm means to said bistable element means whereby the absence of a pulse at said output terminal means during said fourth instant is indicated.

2. The circuit of claim 1 wherein said alarm means comprises first and second bistable devices each having first and second states, said first bistable device having a first input terminal for setting the respective device to said first state upon the application of a pulse thereto, a second input terminal for setting the respective device to said second state upon application of a pulse thereto, and a first output terminal for providing a first output signal when the state of the respective device is changed from said second state to said first state, said second bistable device having a third input terminal for setting the respective device to said first state upon application of a pulse thereto, a fourth input terminal for setting the respective device to said second state upon the application of a pulse thereto, and an output terminal for applying a pulse to said second input terminal when said second bistable device changes from said first state to said second state, coincidence circuit means having fifth and sixth input terminals for applying a pulse to said third input terminal upon coincidence of pulses applied to said fifth and sixth input terminals, means connecting said fifth input terminal to said first output terminal, means applying the output of said bistable circuit means to said first input terminal, means applying a pulse to said first input terminal at a fifth instant, means applying a pulse to said fourth input terminal at a succeeding instant prior to the next fourth instant, output circuit means connected to said first output terminal whereby a pulsatory output signal appears in said output circuit only in the presence of uninterrupted outputs from said bistable circuit means, and means for indicating the absence of said pulsatory output signal.

3. An alarm circuit for indicating the absence of a pulse in a pulse train, comprising a source of said pulse train of pulses occurring at first pulse instants, first and second bistable devices each having first and second states, said first bistable device having a first input terminal for setting the respective device to said first state upon the application of a pulse thereto, a second input terminal for setting the respective device to said second state upon application of a pulse thereto, and a first output terminal for providing a first output signal when the state of the respective device is changed from said second state to said first state, said second bistable device having a third input terminal for setting the respective device to said first state upon application of a pulse thereto, a fourth input terminal for setting the respective device to said second state upon the application of a pulse thereto, and an output terminal for applying a pulse to said second input terminal when said second bistable device changes from said first state to said second state, coincidence circuit means having fifth and sixth input terminals for applying a pulse to said third input terminal upon coincidence of pulses applied to said fifth and sixth input terminals, means connecting said fifth input terminal to said first output terminal, means applying said pulse train to said first input terminal, means applying pulses at second pulse instants to said first input terminal, means applying pulses at said first pulse instant to said sixth input terminal, means applying pulses at succeeding pulse instants before the next first pulse instants to said fourth input terminal, whereby a pulsatory output signal occurs at said first output terminal only in the uninterrupted presence of said pulse train, and means connected to said first output terminal for indicating the absence of said pulsatory output signal.

4. The circuit of claim 3 wherein said source of said pulse train of pulses occurring at first pulse instants comprises a plurality of sources of pulse trains of pulses occurring at different instants, a separate bistable element means connected to each of said plurality of sources, means serially connecting said bistable element means whereby said bistable element means are successively energized by their respective sources, the source of pulse trains of said plurality of sources which are connected to the last bistable element means providing pulses at said first pulse instants, and means for connecting said last bistable element means to said first input terminal, whereby said indicating means indicate the absence of a pulse in the pulse trains of any of said plurality of sources.

References Cited in the file of this patent
UNITED STATES PATENTS

| | | |
|---|---|---|
| 2,589,465 | Weiner | Mar. 18, 1952 |
| 2,597,428 | Bachelet | May 20, 1952 |
| 2,685,683 | Holden et al. | Aug. 3, 1954 |
| 2,769,971 | Bashe | Nov. 6, 1956 |
| 2,899,675 | Clement | Aug. 11, 1959 |
| 3,017,620 | Abzug | Jan. 16, 1962 |